(12) United States Patent
Gherardini

(10) Patent No.: US 6,945,702 B2
(45) Date of Patent: Sep. 20, 2005

(54) FIBER OPTIC CONNECTOR WITH MATING FEATURES

(75) Inventor: Stephen Daniel Gherardini, Harrisburg, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/719,729

(22) Filed: Nov. 21, 2003

(65) Prior Publication Data

US 2005/0111795 A1 May 26, 2005

(51) Int. Cl.[7] ................................................. G02B 6/38
(52) U.S. Cl. ........................................ 385/55; 385/139
(58) Field of Search ...................... 385/55, 139, 77–78, 385/75

(56) References Cited

U.S. PATENT DOCUMENTS

| | | | | |
|---|---|---|---|---|
| 5,091,991 A | * | 2/1992 | Briggs et al. ................. | 385/82 |
| 5,581,645 A | * | 12/1996 | Gehri ........................... | 385/78 |
| 6,305,848 B1 | * | 10/2001 | Gregory ....................... | 385/53 |
| 6,390,690 B1 | * | 5/2002 | Meis et al. .................... | 385/88 |
| 6,398,423 B1 | * | 6/2002 | Novacoski et al. ........... | 385/78 |
| 6,554,486 B1 | * | 4/2003 | Takamatsu et al. ........... | 385/75 |
| 6,572,273 B1 | | 6/2003 | Nguyen ........................ | 385/59 |
| 6,582,133 B2 | * | 6/2003 | Harris et al. .................. | 385/53 |

* cited by examiner

*Primary Examiner*—Hae Moon Hyeon
(74) *Attorney, Agent, or Firm*—Roger C. Turner

(57) ABSTRACT

A fiber optic connector system in which two fiber optic connectors (44, 46) mate within a cabinet (12) and each one can be withdrawn for cleaning. Each connector is part of a connector assembly (40, 42) that includes a mounting bracket (54, 56) fixed to a corresponding daughterboard (20, 22). A motherboard structure (14) is mounted in the cabinet and has holes. Each daughterboard is slid into an opposite end of the cabinet until its connector passes partially through a motherboard hole and mates to the other connector. A pair of standoffs (101, 102) coupled to each connector limits inward movement of each connector to a position at which the tips of mating termini each lies halfway through an alignment sleeve.

10 Claims, 5 Drawing Sheets

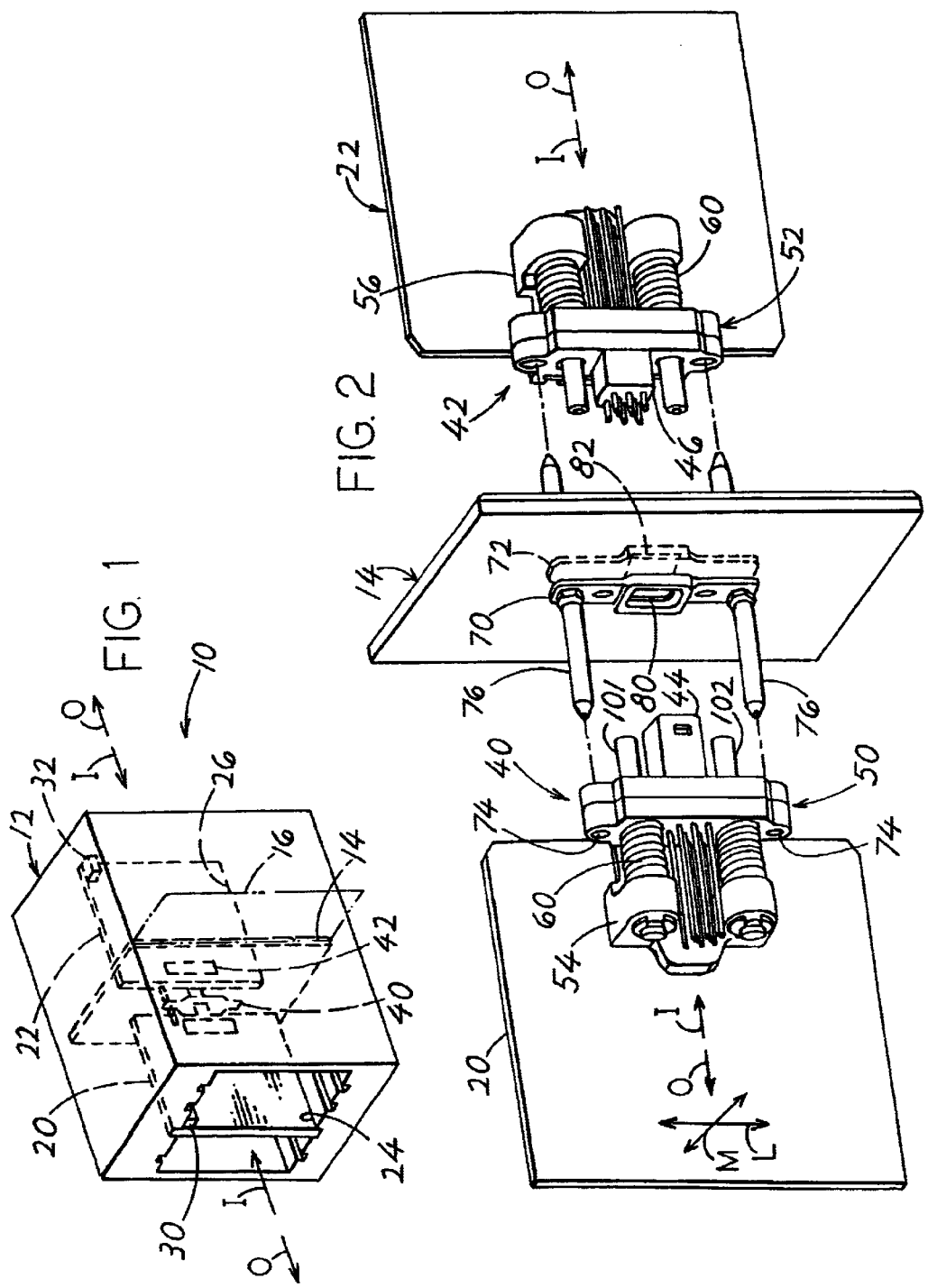

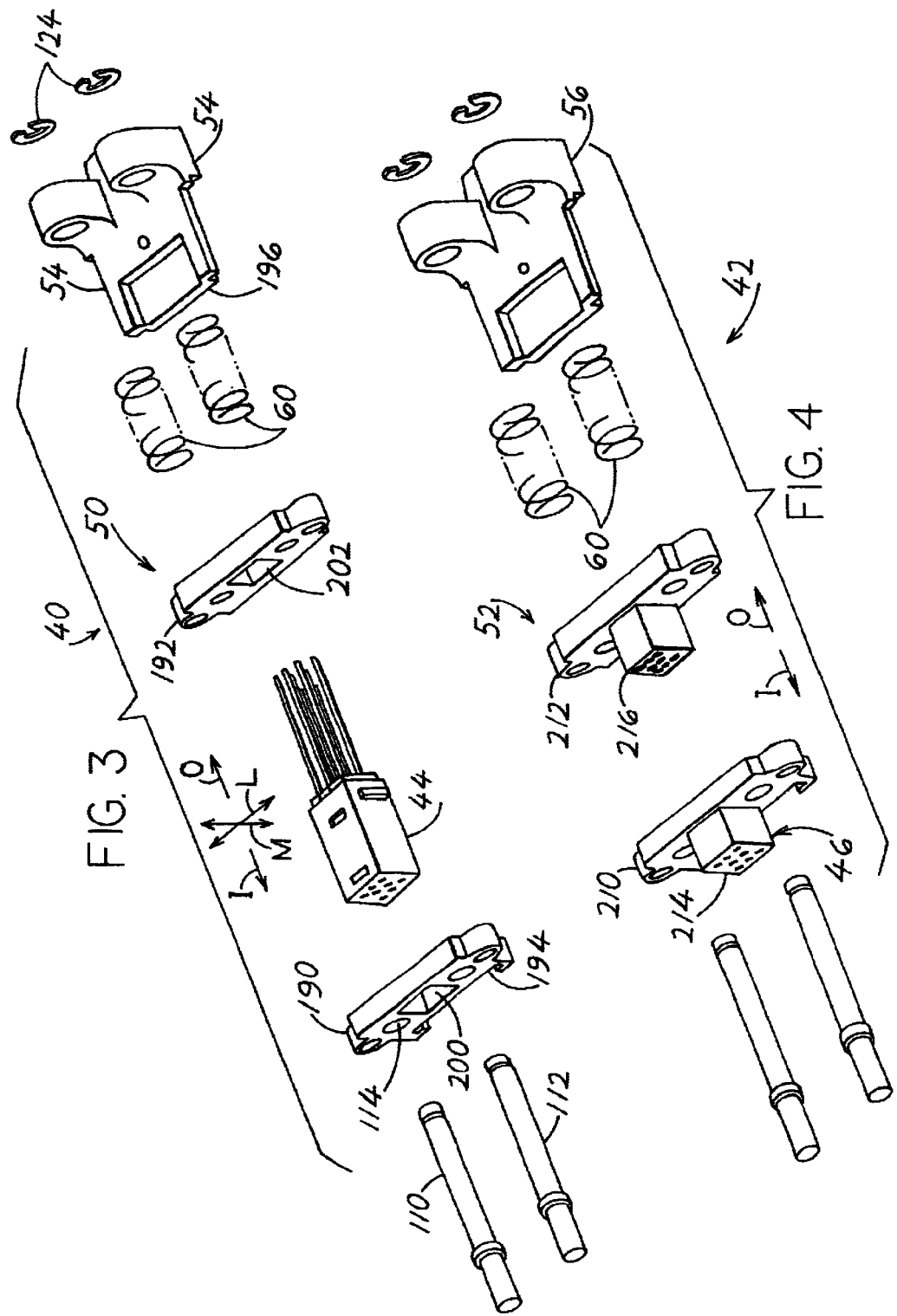

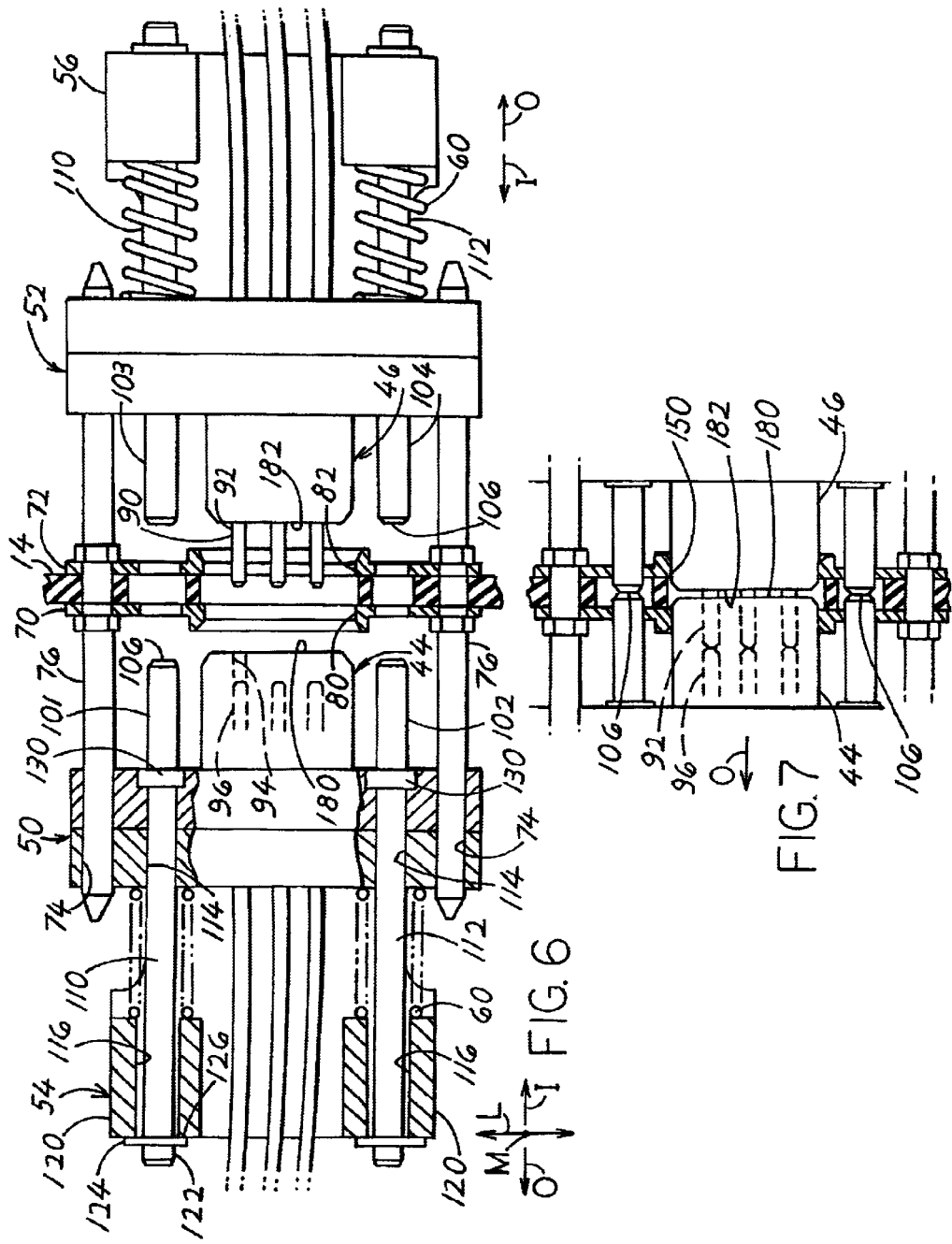

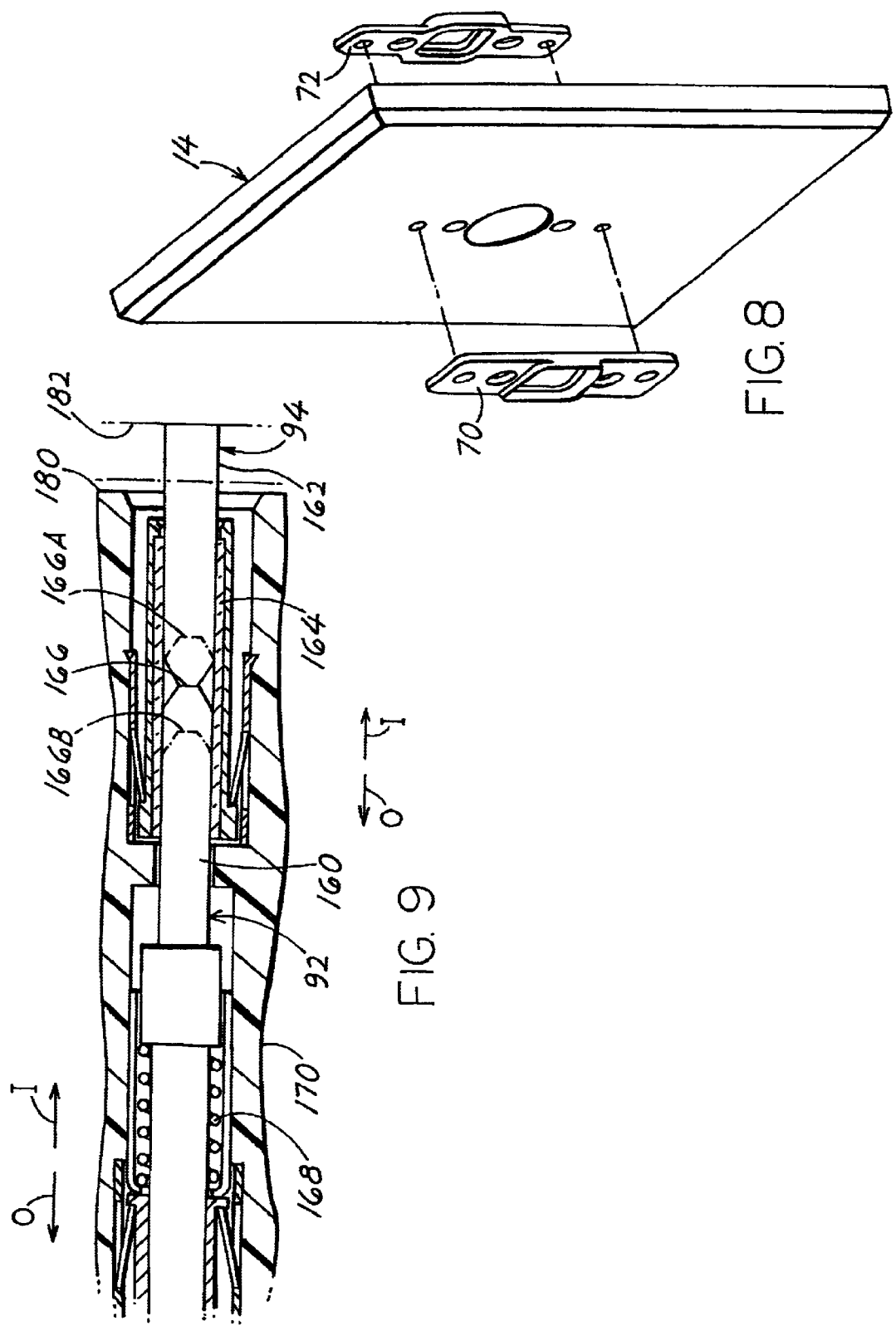

US 6,945,702 B2

FIBER OPTIC CONNECTOR WITH MATING FEATURES

BACKGROUND OF THE INVENTION

One type of fiber optic connector system includes a first connector mounted on a motherboard that lies in a cabinet, and a second connector mounted on a daughterboard that can be slid into and out of the cabinet. Each connector includes a plurality of optic fiber termini, with pairs of termini of the two connectors mated when their tips abut one another. One problem with this type of system is that it is difficult to clean the termini tips of the connector on the motherboard because it is difficult to remove the motherboard.

When two optic fiber connectors mate, they should approach one another closely enough that their termini tips lie at the middle of the length of an alignment sleeve. However, the connector frames should not directly abut one another. A structure for mounting each connector should halt connector movement towards each other when their termini tips lie properly within the alignment sleeves, but allow the boards on which the connectors are mounted to continue to move towards each other until they are latched in position.

SUMMARY OF THE INVENTION

In accordance with one embodiment of present invention, a fiber optic connector system is provided which enables easy access to the termini tips of each of the two mating connectors, and which assures a proper depth of insertion of the connector termini while allowing considerable overtravel of boards on which the connectors are mounted. The system includes first and second fiber optic connector assemblies that each includes a connector mounted on a body, each body being mounted on a mounting bracket and slideable thereon, and each mounting bracket fixed to a corresponding daughterboard. A motherboard structure is mounted deep within a cabinet, and each daughterboard is slideable inwardly from an opposite end of the cabinet towards the motherboard structure. The motherboard structure has at least one hole to allow the connectors to pass through the hole to mate. The motherboard structure has guidepins or guide bores that align the connectors as they approach one another.

Each body on which a connector is mounted, has a pair of standoffs that project toward the other standoffs. The connectors continue to approach one another until tips of the standoffs abut one another. When the standoff tips abut, the termini tips of the two connectors lie halfway between opposite ends of the alignment sleeves, and therefore are properly mated. Each daughterboard can continue to move inwardly until it is latched in position. While a daughterboard and the mounting bracket fixed to the daughterboard continue to move inward, compression springs are compressed and allow the connector and standoffs to not move inward.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a fiber optic connector system of the present invention.

FIG. 2 is an exploded isometric view of parts of the connector system of FIG. 1.

FIG. 3 is an exploded isometric view of the first connector of the connector system of FIG. 2.

FIG. 4 is an exploded isometric view of the second connector of the connector system of FIG. 2.

FIG. 6 is a sectional view of the connector system of FIG. 2, showing the connectors separated.

FIG. 7 is a sectional view of a portion of FIG. 6, but showing the connectors fully mated.

FIG. 8 is an exploded isometric view of the motherboard structure of the connector system of FIG. 2.

FIG. 9 is a partial sectional view showing the termini of two connectors in their proper fully mated positions, and also showing in phantom lines, a position of the first terminus tip in its initial position and a position of the first terminus tip in an extreme inward position.

DESCRIPTION OF THE PREFERRED EMBODIMENTS

Figure 5:
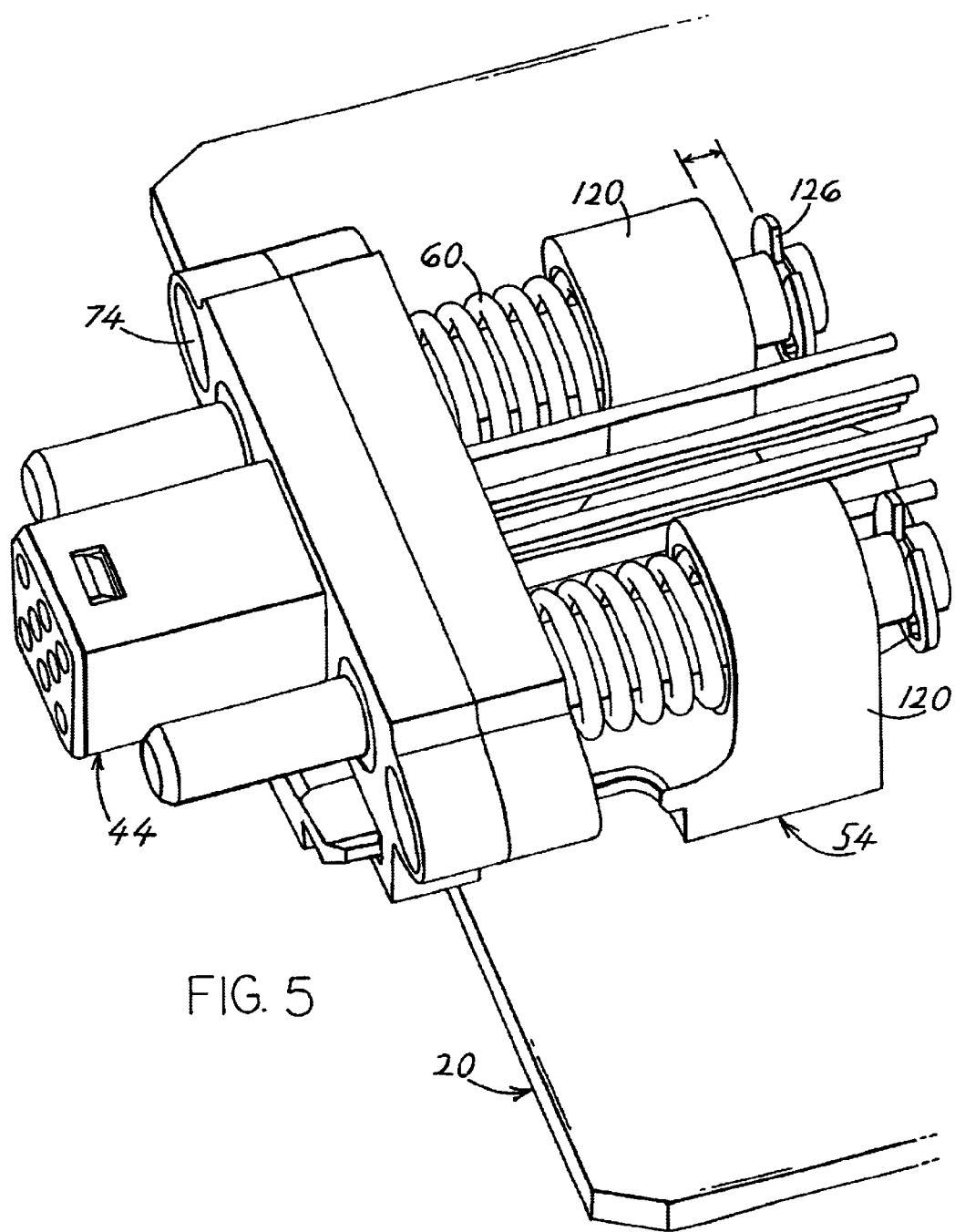
FIG. 5 is an isometric view, taken from the inward end, of the first connector of the connector system of FIG. 2.

FIG. 1 illustrates a fiber optic connector system 10 which includes a housing in the form of a cabinet 12, a motherboard structure or motherboard 14 mounted deep within the cabinet on a midplane 16, and first and second daughterboards 20, 22 lying beyond opposite faces of the motherboard. Each daughterboard is slideable in corresponding inward I and outward O directions toward and away from the midplane of the motherboard. The cabinet has slots 24, 26 forming guides that guide the daughterboards in their sliding movement. A pair of latches 30, 32 hold each corresponding daughterboard in its fully inwardly inserted position.

FIG. 2 shows that first and second connector assemblies 40, 42 are mounted on corresponding daughterboards 20, 22. Each connector assembly includes a fiber optic connector 44, 46, a body 50, 52 on which the connector is mounted, and a mounting bracket 54, 56 on which the body is slideably mounted. Each mounting bracket is fixed to a corresponding daughterboard 20, 22. Each body can slide in corresponding inward and outward directions I, O on its corresponding mounting bracket. Compression springs 60 urge each corresponding body 50, 52 inwardly with respect to the corresponding daughterboard. As described below, each body can shift position slightly relative to a mounting bracket, in lateral L and longitudinal M directions which are perpendicular to each other and to the inward-outward directions.

A pair of midplane shrouds 70, 72 are mounted on opposite faces of the motherboard 14. Each shroud holds a pair of guidepins 76 that enter corresponding pin-receiving bores 74 formed in the bodies. The guidepins provide initial approximate alignment of the two mating connectors 44, 46. As the daughterboards continue to move inwardly towards their final positions, frames of the connectors 44,46 engage guide walls of connector-receiving apertures 80, 82, that provide closer alignment of the mating connectors. A variety of motherboard structures can be used, some of which do not even include a board. However, it is desirable that any motherboard structure include guidepins or bore walls for receiving guide pins.

FIG. 6 shows the mounting brackets 54, 56 approaching the shrouds 70, 72 on the motherboard 14. The guidepins 74, 76 have already passed through holes in the bodies 50, 52 and the connectors 44, 46 are approaching each other to mate. During mating, projecting ends 90 of termini 92 of the second connector 46 enter passages 94 of the first connector and abut termini 96 of the first connector 44. At the same time, standoffs 101–104 coupled to the bodies 50, 52 approach each other until tips 106 of corresponding standoffs abut one another.

FIG. 7 shows the connectors moved towards each other until they are fully mated. The termini 92, 96 have abutted one another and the first termini 96 of the first connector have been deflected outwardly O slightly. The tips 106 of the two pairs of standoffs have abutted one another. The daughterboards 20, 22 of FIGS. 1 and 2 continue to move towards each other until they are each latched in their fully installed positions. During such final movements of the daughterboards, the bodies 50, 52 shown in FIG. 6 remain stationary, while the mounting brackets 54, 56 which are fixed to the daughterboards, continue moving inwardly I slightly (e.g. 0.1 inch) towards each other. During such slight additional movement, the springs 60 are slightly further compressed (e.g. by 0.1 inch) to allow the mounting brackets to move inward while the connectors 44, 46, standoffs 101, 103 and bodies 50, 52 remain stationary.

The standoffs 101, 102 are parts of posts 110, 112 that extend through post-receiving holes 114 in the corresponding body and through holes 116 in projections 120 of the mounting bracket. Rear ends 122 of the posts carry clips 124 that may be considered parts of the posts, and that form inwardly-facing shoulders 126 that abut the mounting bracket. The posts have flanges 130 that abut the bodies 50, 52 to prevent inward movement of the bodies and connectors 44, 46 that are mounted on the bodies, when the standoff tips 106 abut one another. However, the mounting brackets 54, 56 can continue to move inward when the standoffs 101, 102 and connectors no longer move inward.

The posts 110, 112 lie loosely in holes 116 of the mounting bracket projections. As a result, the connectors are not closely laterally L or longitudinally M positioned by the standoffs. However, the connectors are laterally and longitudinally positioned by engagement of the guidepins 74, 76 with bores 114 in the bodies. The connectors 44, 46 can shift laterally and longitudinally only very slightly with respect to the bodies. Walls of the motherboard structure passages 80, 82 help align the connectors 44, 46, and alignment sleeves that surround the termini 92, 94 provide ultimate alignment.

FIG. 9 shows ferrules 160, 162 of two mating termini 92, 94 that lie within an alignment sleeve 164. The tip of one ferrule 160 initially lies at the original position 166A. A ferrule spring 168 biases the ferrule 160 inwardly I with respect to the first connector frame 170. The tip is deflected outwardly O by the mating ferrule 162. Preferably, the ferrule tip 166A is deflected outwardly (with respect to the first connector frame 170), to the final position shown at 166. If the tip deflects outward of a position 166B, then an insufficient length of ferrule 160 lies within the alignment sleeve 164 to assure good alignment. Thus, the position 166B is the predetermined maximum desirable outward position of first ferrule deflection. Assurance that the tip lies close to the desired position 166, is provided by the tips 106 (FIG. 7) of the standoffs abutting one another. It would be possible to rely upon inward ends 180, 182 of the two connectors abutting one another. However, the ends 180, 182 then would be pressed tightly against one another by the forces of the springs 60 and might create debris from rubbing against one another in an environment subject to vibrations. Such debris can harm the fiber tips. The mating ferrule can be fixed in position in its connector frame or may be spring biased inwardly and be deflectable.

In a connector system that applicant has designed, each of the connectors 44, 46 were of the PHD-Tempus type which is of rectangular cross-section with a width of 0.40 inch and height of 0.36 inch. Each half of the system allows the corresponding connector 44,46 to float axially in I, O directions by 0.110 inch in either direction, with respect to the mounting bracket, for a total float of +/−0.220 inch with respect to the mounting brackets.

FIGS. 3 and 4 show details of each connector assemblies 40, 42. The body 50 of assembly 40 includes two body parts 190, 192. The inner body part 190 has a guideway 194. The mounting bracket 54 has a slide in the form of a tongue 196 that is slideably received in the guideway 194. The tongue 196 is "loosely" received in the guideway 194 to allow the connector 44 to move sideways (in directions L and M) by up to ±0.010 inch. Tolerances for the connector 44 in holes 200, 202 in the body, and tolerances for the standoff posts 110, 112 in the body holes 114 are much smaller tolerances (e.g. no more than 0.003 inch) required for assembly. The tongue 196 is wider than the connector 44 and lies between the connector and the daughterboard to provide for stable sliding despite large tolerance in sideward connector shifting. The second connector assembly 42 of FIG. 4 is identical to the first assembly, except for accommodation to mount the second connector 46 in the second body 52 and the construction of the second connector. Applicant notes that the second body 52 includes two body parts 210, 212. The second connector 46 has a frame with connector frame portions 214, 216 that are mounted on the body by being molded integrally with the corresponding second body parts 210, 212.

Thus, the invention provides a fiber optic connector system in which each optical connector is mounted on a board for mating within a cabinet or other housing, but which enables each connector to be easily withdrawn as for cleaning the tips of the optical fiber termini. A motherboard structure lies within the cabinet and provides at least alignment pins or pin-receiving alignment bores, for initial alignment of the two connectors that are to be mated. Each daughterboard carries a connector assembly which includes a mounting bracket fixed to the daughterboard, a body slideable in inward and outward directions on the bracket and biased inwardly, posts with standoffs that abut one another, and a connector on or part of each body. As the connectors mate and their termini tips abut and move within an alignment sleeve, the standoffs abut and prevent further termini tip movement towards each other.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fiber optic connector system for connecting first and second fiber optic connectors that each includes a connector frame and a plurality of optic fiber termini in the frame, each terminus including a terminus ferrule with a ferrule tip that must abut a ferrule tip of a terminus ferrule of the other connector for the termini to mate, and at least one of said optic connectors includes a plurality of termini compression springs that each biases one of its termini inwardly, wherein the connector system includes a housing and a motherboard structure lying in the housing, comprising:

first and second daughterboards;

first and second mounting brackets each fixed to one of said daughterboards;

first and second bodies, each being slideably mounted in inward and outward longitudinal directions on a corresponding one of said mounting brackets and being spring biased inwardly, and each connector being mounted on one of said bodies;

a pair of guide assemblies, each including a guide pin element and walls forming a pin-receiving bore element, one element of each guide assembly being mounted on said motherboard structure and the other element of the guide assembly being mounted on the body of each connector assembly;

standoff means for preventing said connectors from moving further towards each other when said ferrule tips of said connectors have abutted one another and said ferrule springs have being partially compressed;

said housing including a pair of daughterboard guides that each guides one of said daughterboards in inward and outward sliding toward and away from the motherboard structure, and a pair of latches that each retains a corresponding daughterboard in a fully inwardly inserted position in the housing, said motherboard structure having at least one opening that allows said terminus ferrules and said standoff means of said first and second connectors to directly engage each other.

2. The system described in claim 1 wherein:

said standoff means includes a pair of posts fixed against outward movement with respect to each of said bodies and having post inner ends, said motherboard structure having opening areas that allow the post inner ends of posts mounted on the first and second bodies to directly abut one another.

3. The system described in claim 2 wherein:

said posts are each slideable inward and outward on one of said mounting brackets and have post outer ends that project through holes in said mounting bracket, said posts having shoulders that can abut rear ends of said mounting brackets;

a plurality of compression springs, each lying around one of said posts and biasing a corresponding body inwardly with respect to the mounting bracket;

said posts lie loosely in said holes of said mounting bracket, to enable the connectors to shift positions perpendicular to said inward and outward directions.

4. A fiber optic connector system which includes a housing having opposite first and second end portions and a midplane lying between said end portions, a motherboard lying on said midplane, first and second daughterboards lying respectively in said first and second housing end portions, each daughterboard being longitudinally slideable inwardly toward said motherboard to a latched position and outward away from said motherboard, and first and second connector assemblies mounted respectively on said first and second daughterboards, said connector assemblies each including a fiber optic connector with at least one terminus that has a terminus tip and that is mateable to the terminus at the other connector by the terminus tips of the mating termini abutting each other, and wherein at least one of said connectors includes a connector frame, a deflectable terminus and a ferrule spring that biases the corresponding deflectable terminus inward while allowing the deflectable terminus to be deflected outward with respect to the frame when the deflectable terminus engages a mating terminus, the deflectable terminus having a tip that preferable lies no further outward than a predetermined maximum outward position relative to the corresponding connector frame when said deflectable terminus engages the mating terminus, and wherein:

said motherboard has at least one hole;

each of said connector assemblies has a pair of standoffs lying on opposite sides of the corresponding connector, each standoff being fixed against outward longitudinal movement with respect to a corresponding one of said connectors, said standoffs having inner standoff tips, the standoff tips of the first and second connector assemblies being aligned with each other so said tips abut one another when the connectors are fully mated;

said standoff tips being positioned to pass into said motherboard hole and abut one another only after said deflectable terminus has been deflected outwardly, but before said deflectable terminus is deflected outward beyond said predetermined maximum outward position.

5. The system described in claim 4 wherein:

at least one of said connectors includes a mounting bracket fixed to one of said daughterboards, a body that is slideable inward and outward on said mounting bracket, and a spring that urges the body inwardly, a pair of said standoffs being mounted on said body.

6. A method for mating pairs of optic termini of first and second optic fiber connectors, wherein the termini of each pair have tips that abut when the pair of termini mate, which includes mounting said first and second connectors each on a mounting bracket of first and second daughterboards, respectively, that lie on opposite sides of a motherboard structure to allow each connector to slide in inward and outward directions on the corresponding mounting bracket, including:

establishing a pair of standoffs that each has an inward end forming a tip, on each of said optic fiber connectors with each standoff fixed with respect to a corresponding one of said connectors;

sliding each daughterboard inwardly until the standoff tips of said standoffs abut one another, said step of establishing said standoffs including positioning each standoff so the standoff tips abut only after said termini tips of all pairs of mating termini have abutted.

7. A fiber optic connector system, which includes a housing having opposite first and second end portions and a motherboard structure at a midplane lying between said end portions, first and second daughterboards lying respectively in said first and second housing end portions, each daughterboard being longitudinally slideable inwardly toward said midplane to a latched position and outward away from said midplane, and first and second connector assemblies mounted respectively on said first and second daughterboards, said connector assemblies each including a fiber optic connector with a terminus that has a terminus tip and that is mateable to the other terminus by their terminus tips abutting each other, wherein a first of said connectors includes a first connector frame and a ferrule spring and a first of said termini, said first of said termini being a deflectable terminus that is slideable longitudinally in said first connector frame, and said ferrule spring biases said deflectable terminus inward while allowing the deflectable terminus to be deflected outward with respect to the frame when the deflectable terminus engages a mating terminus, the terminus tip of the deflectable terminus preferably lies no further outward than a predetermined maximum outward position relative to the first connector frame, and wherein:

each of said connector assemblies has a pair of standoffs lying on opposite sides of the corresponding connector, each standoff being fixed against outward longitudinal movement with respect to one of said connectors, said standoffs having inner standoff tips, the standoff tips of the first and second connector assemblies being aligned with each other so said standoff tips abut one another when the connectors are fully mated;

said standoff tips being positioned to abut one another after said deflectable terminus has been deflected outwardly, but before said deflectable terminus is deflected outward beyond said predetermined maximum outward position.

8. A fiber optic connector system which includes a housing having opposite first and second end portions and a midplane motherboard structure lying between said end portions, first and second daughterboards lying respectively in said first and second housing end portions, each daughterboard being longitudinally slideable inwardly toward said midplane to a latched position and outward away from said midplane, and first and second connector assemblies mounted respectively on said first and second daughterboards, said connector assemblies each including a fiber optic connector with at least one terminus that has a terminus tip and that is mateable to the other terminus by their terminus tips abutting each other, and at least one of said connector assemblies including a mounting bracket fixed to the corresponding daughterboard with the corresponding connector being mounted to slide longitudinally on the mounting bracket and being biased inwardly relative to the mounting bracket, wherein:

said mounting bracket includes an outer end forming a pair of mounting bracket holes;

each of said connector assemblies includes a body on which a corresponding one of the connectors is mounted, each body having a pair of post-receiving holes aligned with said mounting bracket holes;

each of said connector assemblies includes a post with an inward part forming a standoff and an outer part extending through one of said post-receiving holes in said body and through a mounting bracket hole in said mounting bracket, and each post having an inwardly-facing shoulder lying outward of a corresponding mounting bracket hole; and including a pair of coil springs each lying around one of said posts and lying between said body and said mounting bracket outer end to bias the body inward relative to the mounting bracket;

each of said posts being fixed against outward movement relative to a corresponding one of said bodies, and each of said standoffs formed by said post inner ends is positioned to engage a standoff of another of said connector assemblies to limit inward movement of said connectors.

9. A fiber optic connector system which includes a housing having opposite first and second end portions and a motherboard at a midplane lying between said end portions, first and second daughterboards lying respectively in said first and second housing end portions, each daughterboard being longitudinally slideable inwardly toward said midplane to a latched position and outward away from said midplane, and first and second connector assemblies mounted respectively on said first and second daughterboards, said connector assemblies each including a fiber optic connector with at least one terminus that has a terminus tip and that is mateable to the other terminus by their terminus tips abutting each other, and at least one of said connector assemblies including a mounting bracket fixed to the corresponding daughterboard with the corresponding connector being mounted to slide longitudinally on the mounting bracket and being biased inwardly relative to the mounting bracket, wherein:

each of said connector assemblies includes a body with each connector being mounted on a corresponding body, each body forming a tongue guide and each bracket forming an inwardly-projecting tongue that is slideably positioned in a corresponding tongue guide;

each tongue lying between the corresponding daughterboard and the corresponding connector.

10. The system described in claim 9 wherein:

each tongue lies loosely in a corresponding tongue guide to purposely allow body shifting of at least 0.01 inch perpendicular to said inward and outward directions.

* * * * *